United States Patent
Kumar et al.

(10) Patent No.: US 9,135,170 B2
(45) Date of Patent: Sep. 15, 2015

(54) MEMORY MAPPING AND TRANSLATION FOR ARBITRARY NUMBER OF MEMORY UNITS

(75) Inventors: Sailesh Kumar, San Jose, CA (US); William Lynch, Los Altos, CA (US); Joji Philip, San Jose, CA (US); Michel Hanna, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 684 days.

(21) Appl. No.: 13/472,180

(22) Filed: May 15, 2012

(65) Prior Publication Data

US 2013/0311747 A1    Nov. 21, 2013

(51) Int. Cl.
*G06F 12/10* (2006.01)
*G06F 12/06* (2006.01)

(52) U.S. Cl.
CPC ............ *G06F 12/0607* (2013.01); *G06F 12/10* (2013.01)

(58) Field of Classification Search
CPC .............................. G06F 12/0607; G06F 12/10
USPC ........................................................... 711/202
See application file for complete search history.

(56) References Cited

U.S. PATENT DOCUMENTS

| 7,188,204 | B2* | 3/2007 | Kuzmenka et al. | 710/300 |
| 2005/0246502 | A1 | 11/2005 | Joshi et al. | |
| 2006/0023517 | A1 | 2/2006 | Cabillic et al. | |
| 2009/0259882 | A1* | 10/2009 | Shellhamer | 714/7 |
| 2012/0117305 | A1* | 5/2012 | Arya | 711/103 |

* cited by examiner

*Primary Examiner* — Aracelis Ruiz
(74) *Attorney, Agent, or Firm* — Conley Rose, P.C.; Grant Rodolph; William H. Dietrich

(57) ABSTRACT

A method for address translation in a memory comprising a plurality of memory streaming units (MSUs), wherein n represents the number of MSUs and n is not a power of two, and wherein the memory further comprises a striped region, the method comprising determining an MSU from among the plurality of MSUs having a physical address (PA) in the striped region corresponding to a logical address (LA) comprising performing a modulo n operation on less than all the bits representing the LA; and transmitting the LA to the MSU.

27 Claims, 7 Drawing Sheets

MEMORY MAPPING AND TRANSLATION FOR ARBITRARY NUMBER OF MEMORY UNITS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A modern storage device may be viewed as a single entity from the perspective of system or application level software, for example, but the storage device may actually comprise a number of different physical memory storage units or devices, such as physical dynamic random access memory (DRAM) devices. From the perspective of system or application software, the address space of a memory with a plurality of physical memory storage devices may appear to be a continuous logical address space. Consequently, system or application software may employ logical addresses (LAs) to access memory, but an LA may need to be mapped to a physical address (PA) in order to retrieve data from memory. Part of this mapping may involve determining the identity of the physical memory storage device (from among a plurality of storage devices) containing the data to be retrieved. In some memory architectures, once the physical memory storage device is identified, the LA may be transmitted to that storage device, where a final step of determining the PA may be performed and data retrieved from a memory location corresponding to the PA. Converting an LA into an identifier of a physical memory device and a PA of the physical memory device may be referred to as memory translation. The details of memory translation may be hidden from other parts of the system connected to the memory device and performed in the memory device itself or in related hardware or software.

A mapping of an LA to a PA may be performed in one clock cycle and with simple operations if the number of physical memory storage units or devices is a power of two. For example, if the logical address space spans n physical memory storage units, where n is a power of two, identifying the particular physical memory unit corresponding to a particular LA may involve shifting $\log_2 n$ bits out of the LA to identify the physical memory unit. Such operations may be all that is needed to implement a modulo n operation. Further determining the PA given the identity of the memory unit may also be relatively simple if the number of memory units is a power of two.

In some scenarios it may be desirable for the number of physical memory storage devices in a memory to be an arbitrary number that is not restricted to be a power of two. For example, in a memory in which speed, cost, chip area, and/or power may be at a premium, configuring a memory using five physical memory storage devices, such as five DRAM chips, rather than eight physical memory storage devices may be preferable. However, in such situations, mapping an LA to a PA may become more complex. A modulo operation to identify the physical memory storage device corresponding to data to be retrieved may involve costly and/or slow division circuits to perform the mapping. For example, supposing an LA is represented by K bits, where K is an arbitrary integer, a modulo n operation to identify the physical memory storage device corresponding to the LA may involve a division operation using all K bits of the LA, if conventional or brute-force techniques are employed. The larger the value of K, the more costly the division operation in terms of memory access speed and/or cost. These issues may be particularly acute if the memory employs striped and non-striped regions. There is thus a need to reduce complexity and/or increase speed of a translation of LAs to PAs in memory devices with an arbitrary number of physical memory units.

SUMMARY

In one aspect, the invention includes a method for address translation in a memory comprising a plurality of memory streaming units (MSUs), wherein n represents the number of MSUs and n is not a power of two, and wherein the memory further comprises a striped region, the method comprising determining an MSU from among the plurality of MSUs having a physical address (PA) in the striped region corresponding to a logical address (LA) comprising performing a modulo n operation on less than all the bits representing the LA, and transmitting the LA to the MSU.

In another aspect, the invention includes an apparatus comprising a memory comprising a plurality of MSUs, wherein the number of MSUs is represented as n and n is not a power of two, wherein the memory comprises a striped region; and a processor that determines an MSU from among the plurality of MSUs having a PA corresponding to an LA comprising performing a modulo n operation on less than all the bits representing the LA.

In yet another aspect, the invention includes an apparatus comprising a memory comprising a plurality of MSUs, wherein the number of MSUs is represented as n and n is not a power of two, wherein the memory comprises a striped region and a non-striped region, wherein an LA space comprising a plurality of LAs is distributed across the striped and non-striped regions, wherein each of the MSUs further comprises an MSU magic block (MMB), and a processor configured to translate an LA corresponding to a PA to determine an MSU identifier (ID) of the MSU having the PA corresponding to the LA, wherein each MMB is configured to translate the LA into a PA, wherein if the PA corresponds to the non-striped region, the PA is determined based on adding to or subtracting values from less than all bits representing the LA, and wherein if the PA corresponds to the striped region, the PA is determined based on an integer division comprising dividing less than all bits representing the LA by n.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Systems, apparatuses, and methods are disclosed herein for translating an LA into a PA for an arbitrary number of physical memory devices in a memory, wherein the translation includes identifying a physical memory device from among the plurality of memory devices and determining a PA for the particular memory device based on an LA. The systems, apparatuses, and methods significantly improve timing requirements and/or reduce complexity of a memory translation in devices in which the number of memory devices is not a power of two at the expense of relatively small unused portions of the physical memory space. The systems, methods, and apparatuses may be applicable for memories that employ replicated non-striped regions, non-replicated non-striped regions, and non-replicated striped regions.

Figure 1:
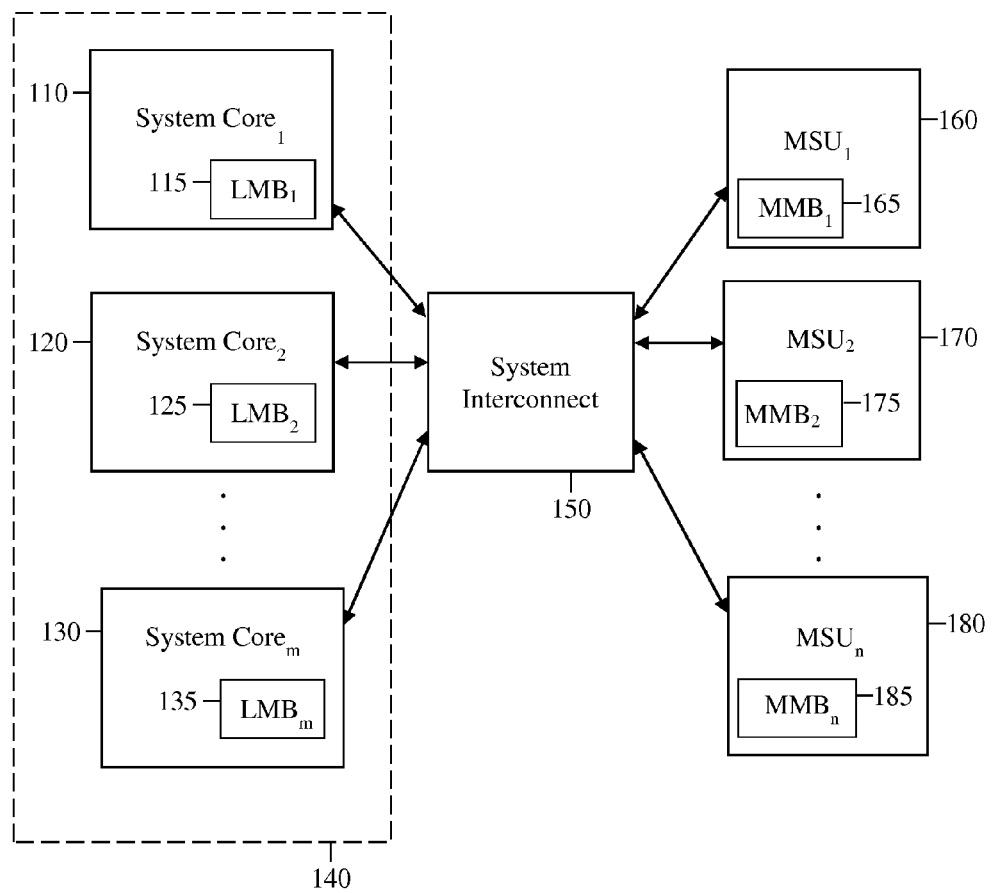
FIG. 1 is an embodiment of a system for accessing memory.

FIG. 1 is an embodiment of a system for accessing memory. The system comprises m system cores 110, 120, and 130 configured as shown in FIG. 1, where m is an integer. Each of the system cores 110, 120, and 130 may be a processor, which may be implemented as a central processing unit (CPU) chip or an application specific integrated circuit (ASIC). Further, each of the system cores 110, 120, and 130 comprises a local magic block (LMB) 115, 125, and 135, respectively, as shown in FIG. 1. A multi-core system 140 may comprise system cores 110, 120, and 130. The system cores may be connected via system interconnect switch 150 to n memory streaming units (MSUs) 160, 170, and 180 configured as shown in FIG. 1, where n is an integer. The value of n may be arbitrary, including values that are not a power of two. The system interconnect switch 150 may comprise switching fabric for connecting system cores, such as system cores 110, 120, and 130, to MSUs, such as MSUs 160, 170, and 180. The system interconnect switch 150 may have m ingress ports and n egress ports for connecting m system cores to n MSUs. Further, the system interconnect switch 150 may provide a selectable path for communication between system cores and MSUs. An MSU may comprise an MSU memory, as well as one or more controllers for accessing the MSU memory. For example, an MSU memory may be a multi-bank DRAM memory, such as double data rate type three (DDR3) DRAM. Each of the n MSUs 160, 170, and 180 comprises an MSU magic block (MMB) 165, 175, and 185, respectively, as shown in FIG. 1. The system for accessing memory may be implemented as a single integrated circuit (IC) or chip, such as a network on chip (NoC). A plurality of MSUs, such as MSUs 160, 170, and 180, may be viewed by a system core or a plurality of system cores as a single memory or memory device.

LMBs and MMBs work together to translate an LA of a memory into an MSU identifier (ID) and a PA. The MSU ID may instead be an MSU address, rather than ID, depending on the application. For illustration, the disclosure focuses primarily on translation to MSU ID. An LA may be an address of a memory space as seen by software, such as software running on a processor or a multi-core processor, such as multi-core processor 140. It may not be necessary for some software to be aware of how the physical memory is configured, as memory translation may take place inside a system for accessing memory, such as the system in FIG. 1. The MSU corresponding to the MSU ID may use the PA to retrieve data from a memory location identified by the PA.

Figure 2:
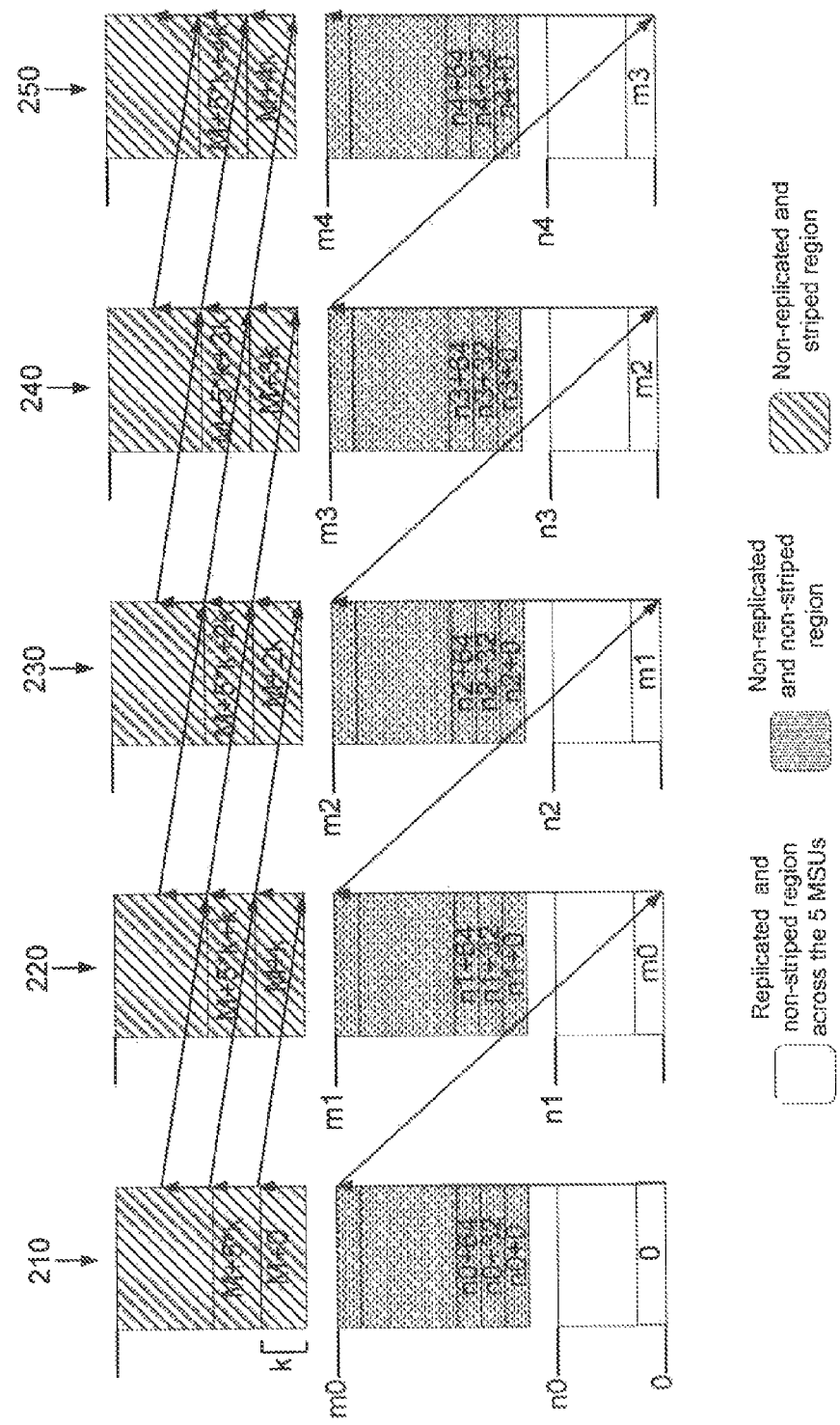
FIG. 2 is an illustration of an embodiment of a DRAM address space.

FIG. 2 is an illustration of an embodiment of a DRAM address space for a system with five MSUs and N internal DRAM banks per MSU, where N is an integer that is greater than one. Five MSUs are used for illustration, but the concepts apply to any number of MSUs. The total logical address space may be partitioned into three types of regions: (1) a bank replicated but non-striped (RNS) region; (2) a non-replicated non-striped (NRNS) region; and (3) a non-replicated and striped (NRS) region.

The logical address space for the first, second, third, fourth, and fifth MSUs is illustrated in FIG. 2 as 210, 220, 230, 240, and 250, respectively, and each of the three types of regions is shown. The bottom region represents the RNS region. In this region every block of size B bytes may be replicated across all the N internal DRAM banks for faster access. The size of this region in each MSU is XB, which is also the boundary between this region and the next region, which is the NRNS region. In the NRNS regions, data may not be replicated across internal DRAM banks, and the region may not be striped across the MSUs. A size of this region may be Y-XB, where Y is a boundary between the NRNS region and another region. In one embodiment, XB may be a multiple of 16 MB. Further, Y and XB may be such that there are no holes in the address space. Finally, in the NRS region data may not be replicated across internal DRAM banks, but the region may be striped across the MSUs in units of k bytes. Note that k may be a power-of-two and multiple of B bytes.

The arrows in FIG. 2 indicate the numbering of consecutive addresses in the LA space. That is, the LA space may start at address 0 in the first MSU as shown in 210. The LA space for the RNS region in the first MSU may be numbered consecutively to n0. The NRNS region for the first MSU may be numbered consecutively from n0 to m0 as shown in FIG. 2. Then the numbering continues to the RNS region in the second MSU as illustrated by 220 in FIG. 2. Thus, mi represents an NRNS boundary for the (i+1)th MSU, and likewise ni represents a RNS region for the (i+1)th MSU. The NRS region may begin at address M as shown in FIG. 2. The value of M may not be equal to m4 in which case there may be a hole in the address space. The NRS region may be striped across the MSUs in units of k bytes as indicated by the arrows. Striping proceeds from MSU 1 210 to MSU 2 220 and so on to MSU 5 250, at which point striping starts over at MSU 1 210 and the process repeats. Note that the NRNS and RNS regions may have different sizes in each MSU and the sizes may be programmable, whereas the size of the NRS region may be the same in all MSUs but may also be programmable.

A LMB may be an address decoding unit that receives an LA as an input and provides a destination ID of the MSU that contains the corresponding PA. An LA of 40 bits is used in the following example for illustrative purposes, and five MSUs continue to be used for illustrative purposes. Table 1 describes configuration registers that may be programmed for an LMB unit, and Table 2 describes the node IDs of each of the five MSUs.

TABLE 1

Non-striped memory region boundary configuration in LMB.

| Bits | Field | Description |
|---|---|---|
| 16 | nrns_region_end_4 | Global end LA of the NRNS region in MSU 4. It may be in granularity of 16 MB. |
| 16 | nrns_region_end_3 | Global end LA of the NRNS region in MSU 3. It may be in granularity of 16 MB. |
| 16 | nrns_region_end_2 | Global end LA of the NRNS region in MSU 2. It may be in granularity of 16 MB. |
| 16 | nrns_region_end_1 | Global end LA of the NRNS region in MSU 1. It may be in granularity of 16 MB. |
| 16 | nrns_region_end_0 | Global end LA of the NRNS region in 0. It may be in granularity of 16 MB. |

TABLE 2

Node IDs of the five MSUs.

| Bits | Field | Description |
|---|---|---|
| 6 | msu_node_id_4 | Node ID of MSU 4. |
| 6 | msu_node_id_3 | Node ID of MSU 3. |
| 6 | msu_node_id_2 | Node ID of MSU 2. |
| 6 | msu_node_id_1 | Node ID of MSU 1. |
| 6 | msu_node_id_0 | Node ID of MSU 0. |

Below is one example of pseudo-code to carry out the operation of determining MSU ID:

```
lmb_*_nrs_valid = 0;
if (*_lmb_pa[39:24] <= nrns_region_end_0)
    lmb_*_msu_id = msu_node_id_0;
else if (*_lmb_pa[39:24] <= nrns_region_end_1)
    lmb_*_msu_id = msu_node_id_1;
else if (*_lmb_pa[39:24] <= nrns_region_end_2)
    lmb_*_msu_id = msu_node_id_2;
else if (*_lmb_pa[39:24] <= nrns_region_end_3)
    lmb_*_msu_id = msu_node_id_3;
else if (*_lmb_pa[39:24] <= nrns_region_end_4)
    lmb_*_msu_id = msu_node_id_4;
else {    lmb_*_nrs_valid = 1;    goto striped_region; }
```

The pseudo-code above may be implemented in an address bound check unit comprising 5×16-bit comparators to check whether the 16 most significant bits (MSBs) of LA is less than the configured non-striped end address boundary of each MSU.

For the striped region, determining the MSU where a given LA is located may be trivial when the number of MSUs is a power of two. An appropriate number of least significant bits (LSBs) in the LA may indicate the MSU containing that block. However when the number of MSUs is not a power of two, determining the MSU corresponding to an LA requires a modulo operation to be performed on the LA. Modulo operations require a divider circuit which may require an increasing number of clock cycles as the number of operand bits of the numerator increases. Brute force approaches may use all the bits of the LA as the numerator, for example. Instead of the entire LA, the systems and methods described herein use a limited number of bits from the LA to perform the modulo operation, which may significantly improve the timing of the divider circuit at the expense of a few unused memory blocks or holes in the physical memory space. Table 3 illustrates the concept for striping LA address blocks over 5 physical MSUs using 6-bits from the LA of the block in the modulo-5 operation. Note that the black solid rectangles represent an empty address space that cannot be used for this embodiment.

TABLE 3

Mod-5 Unit that implements a modulo-5 operation on a 6-bit input and gives a 3-bit output.

| Block PA → | 0 | 1 | | 12 | 13 | 14 | | 25 | 26 |
|---|---|---|---|---|---|---|---|---|---|
| MSU 4 | Block LA 4 | Block LA 9 | ... |  | Block LA 68 | Block LA 73 | ... |  | ... |
| MSU 3 | Block LA 3 | Block LA 8 | ... | Block LA 63 | Block LA 67 | Block LA 72 | ... | Block LA 127 | ... |
| MSU 2 | Block LA 2 | Block LA 7 | ... | Block LA 62 | Block LA 66 | Block LA 71 | ... | Block LA 126 | ... |
| MSU 1 | Block LA 1 | Block LA 6 | ... | Block LA 61 | Block LA 65 | Block LA 70 | ... | Block LA 125 | Block LA 129 |
| MSU 0 | Block LA 0 | Block LA 5 | ... | Block LA 60 | Block LA 64 | Block LA 69 | ... | Block LA 124 | Block LA 128 |

One embodiment of LMB may be a combinatorial block or circuit that receives a 40-bit LA as input and provides two outputs: (1) 1-bit output indicating whether the LA is in a striped region (i.e., NRS region) or non-striped region (i.e., RNS or NRNS regions), and (2) a 6-bit node ID of the MSU. Note that the node ID may instead be represented by as few as three bits since there are only five MSUs in this embodiment (i.e., five objects may require at least three bits for unique identification). Thus, any number of bits greater than or equal to three bits may suffice.

The following pseudo code represents the LMB logic for the striped region, where the notation "N % M" represents the operation N modulo M, where N and M are integers:

```
striped_region:
    msu=*_lmb_pa[16:11] % 5);
    if (lmb_*_nrs_valid==1) lmb_*_msu_id=msu_node_id_[msu]
```

A general expression to determine the MSU number for the striped region for an arbitrary of MSUs is $MSU_{ID}=LA[BLK_{LSB}+MOD_{BITS}-1: BLK_{LSB}] \% NUM_{MSU}$, where $MSU_{ID}$ is the MSU where the logical block is contained, LA is the logical address of the block, $BLK_{LSB}$ is the LSB of the block's LA that will be used to generate the MSU ID, $MOD_{BITS}$ is the number of bits of the LA used in the modulus operation, and $NUM_{MSU}$ is the number of MSUs in the system (e.g., $NUM_{MSU}$=n for the system of FIG. 1).

Figure 3:
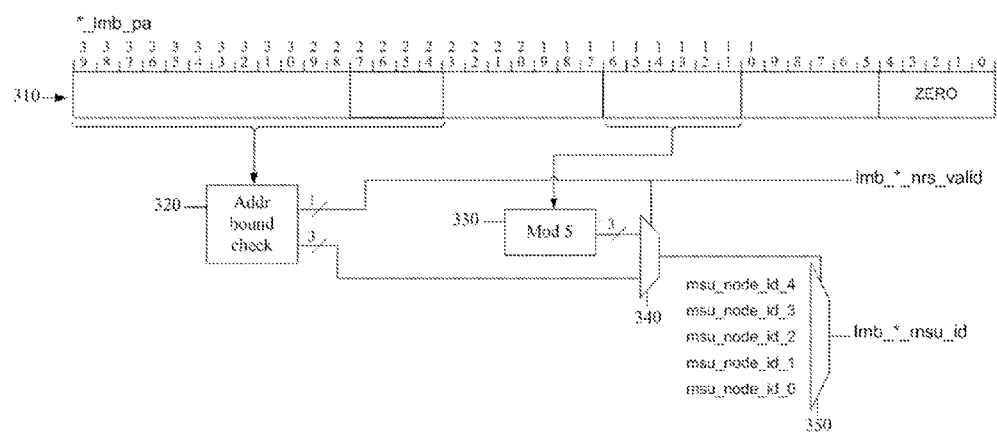
FIG. 3 is a schematic of an embodiment of a local magic block (LMB).

FIG. 3 is a schematic of an embodiment of a LMB. The LMB in FIG. 3 implements the pseudo-code described above for a 40-bit LA 310. The LMB comprises an address bound check 320, a block 330 that performs a mod 5 operation, and multiplexers 340 and 350 configures as shown in FIG. 3, each of which may be implemented using standard digital logic circuits. The sixteen MSBs of LA 310 may be input to an address bound check unit 320. The address bound check unit 320 may comprise 5×16-bit comparators to check whether the 16 MSBs of the LA 310 is less than the configured non-striped end address boundary of each MSU. The address bound check unit 320 may have two outputs: (1) a one-bit output lmb_*_nrs_valid that may indicate whether the PA is in a striped region or non-striped region; and (2) a three-bit output that may be input to multiplexer 340. The other three-bit input to multiplexer 340 may be an output of block 330 that performs a mod 5 operation on bits 11 through 16 of the LA. If lmb_*_nrs_valid=0 (i.e., the PA is in a non-striped region), the multiplexer 340 selects the three-bit output of the address bound check unit 320, and if lmb_*_nrs_valid=1 (i.e., the PA is in a striped region), the multiplexer 340 selects the three-bit output of the mod 5 unit 330. The output of multiplexer 340 selects the appropriate MSU ID at multiplexer 350 for output as lmb_*_msu_id.

The embodiment of the LMB in FIG. 3 may be generalized by for an arbitrary number n of MSUs and an arbitrary number of bits in the LA. For example, address bound check 320 may perform n comparisons. Further, block 330 may be replaced by a block that performs a mod n operation. Also, multiplexer 350 may be configured to select from among n IDs. The address bound check and modulo blocks may be configured to accept any number of bits as an input.

The percentage of unused physical memory blocks may be represented as $$PA_{unused} = \frac{NUM_{MSU} - (2^{MOD_{BITS}} - 1)\% \; NUM_{MSU} - 1}{\left(\left\lfloor \frac{2^{MOD_{BITS}} - 1}{NUM_{MSU}} \right\rfloor + 1\right) \times NUM_{MSU}} \times 100,$$

where $MOD_{BITS}$ is the number of bits of the LA used in a modulus operation to determine MSU ID, and $NUM_{MSU}$ is the number of MSUs in the system (e.g., $NUM_{MSU}$=n for the system of FIG. 1). The following table shows the percentage of unused blocks for different number of MSU and LA bits used in the modulus operation.

TABLE 4

Percentage of unused physical blocks.

| | $NUM_{MSU}$ | | | | | | |
|---|---|---|---|---|---|---|---|
| | 3 | 4 | 5 | 6 | 7 | 8 | 9 |
| $MOD_{BITS}$ | Percentage of unused physical blocks | | | | | | |
| 4  | 11.11 | 0.00 | 20.00 | 11.11 | 23.81 | 0.00 | 11.11 |
| 5  | 3.03  | 0.00 | 8.57  | 11.11 | 8.57  | 0.00 | 11.11 |
| 6  | 3.03  | 0.00 | 1.54  | 3.03  | 8.57  | 0.00 | 11.11 |
| 7  | 0.78  | 0.00 | 1.54  | 3.03  | 3.76  | 0.00 | 5.19  |
| 8  | 0.78  | 0.00 | 1.54  | 0.78  | 1.16  | 0.00 | 1.92  |
| 9  | 0.19  | 0.00 | 0.58  | 0.78  | 1.16  | 0.00 | 0.19  |
| 10 | 0.19  | 0.00 | 0.10  | 0.19  | 0.49  | 0.00 | 0.19  |
| 11 | 0.05  | 0.00 | 0.10  | 0.19  | 0.15  | 0.00 | 0.19  |
| 12 | 0.05  | 0.00 | 0.10  | 0.05  | 0.15  | 0.00 | 0.19  |
| 13 | 0.01  | 0.00 | 0.04  | 0.05  | 0.06  | 0.00 | 0.09  |
| 14 | 0.01  | 0.00 | 0.01  | 0.01  | 0.02  | 0.00 | 0.03  |
| 15 | 0.00  | 0.00 | 0.01  | 0.01  | 0.02  | 0.00 | 0.00  |

Note that for MSU numbers of 4 and 8 (i.e., powers of two) the percentage of unused physical blocks may be 0%. This indicates that the LMB may be no less efficient than conventional approaches for those two special cases because in those two cases the memory addresses are aligned perfectly without any unused blocks. Further, there may be a general decline in the percentage of unused blocks for numbers of MSUs not a power of two as the number of bits used in the modulo operation increases.

A number of bits used for the modulo operation may be selected to reduce the percentage of unusable memory blocks, while keeping the modulo circuit fast in speed and small in size. Thus, a LMB may allow the system to employ striping across a flexible number of physical memories without compromising on the speed of the address processing logic.

An MMB may be a unit inside an MSU that receives an LA and provides the PA of the data inside one of the three memory regions in the MSU. Data in memory may be retrieved at the determined PA. An LA of 40 bits and five MSUs continue to be used in this embodiment for illustrative purposes. Configuration registers of an MMB may be programmed according to Table 5 below.

TABLE 5

Memory region boundary configurations in an MMB.

| Bits | Field | Description |
|---|---|---|
| 16 | nrs_region_global_start | Global logical start address of the global NRS region (this value is same in all MSUs). It may be in granularity of 16 MB. |
| 16 | nrs_region_local_start | Local MSU start address of the NRS region in this MSU. It is in granularity of 16 MB. |
| 16 | nrns_region_end | Global logical end address of the NRNS region in this MSU. It may be in granularity of 16 MB. |
| 16 | nrns_region_global_start | Global logical start address of the NRNS region in this MSU. It may be in granularity of 16 MB. |

TABLE 5-continued

Memory region boundary configurations in an MMB.

| Bits | Field | Description |
|---|---|---|
| 16 | rns_region_start | Global logical Start address of the RNS region in this MSU. It may be in granularity of 16 MB. |
| 16 | nrns_region_local_start | Local MSU start address of the NRNS region in this MSU. It may be aligned at 16 MB boundary. Software has to program this after adjusting for the 16 bank replication in the RNS region. |

One advantage of having separate two configurations for the nrs_region_global_start and nrs_region_local_start addresses (per MSU LA) is that each MSU can have different physical memory size while still supporting striping across MSUs.

Figure 4:
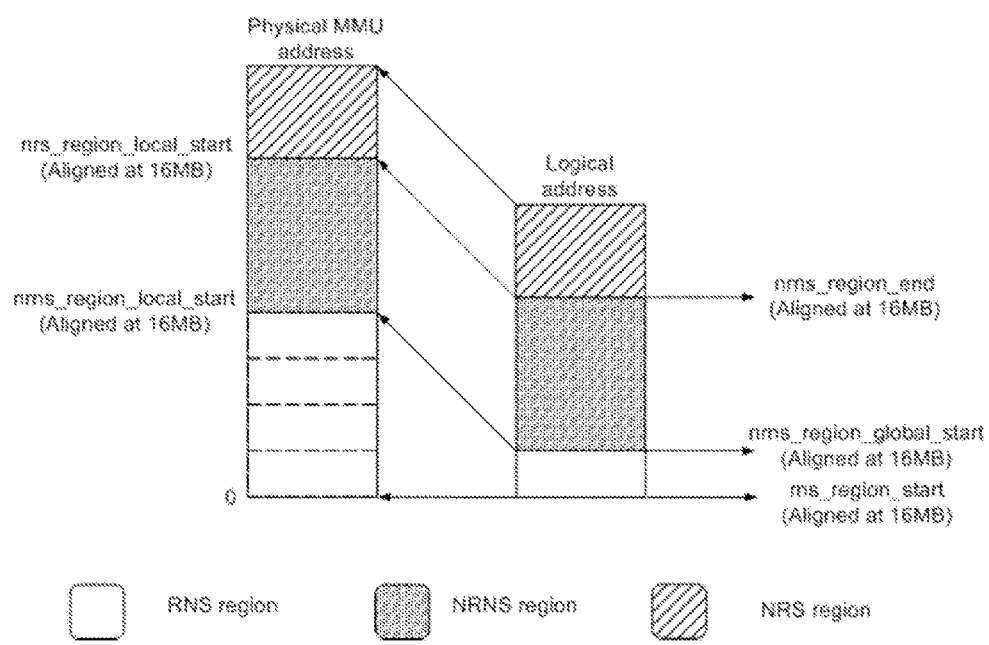
FIG. 4 is an illustration of address expansion for a replicated non-striped (RNS) region.

FIG. 4 is an illustration of address expansion for a RNS region in an MMB. For this embodiment, the RNS regions begin at a global addresses aligned to 16 MB and at address 0 for each MSU, and FIG. 4 shows replication to four banks for illustrative purposes. The RNS region has a granularity of 16 MB in each bank and a minimum of 256 MB total across all 16 banks. Software may view the RNS region as a multiple of 16 MB, but in an MSU physical memory this region takes up multiple of 16×16 MB. This memory expansion may be performed by the MMB and may be transparent to software. The nx 16 MB RNS LA space appears contiguous to the NRNS space.

A MMB may be a fully combinatorial block. The LA may be compared with the start address of RNS and NRNS regions to determine whether it belongs to one of those regions. If it does, the MMB may subtract the configured start address from the LA to obtain the local MSU address. The following is the pseudo code describes these operations.

```
if (msu_mmb_pa[39:24] < nrns_region_global_start) {
    mmb_msu_rns_valid = 1;
    mmb_msu_nrns_valid = 0;         }
else if (msu_mmb_pa[39:24] <= nrns_region_end) {
    mmb_msu_rns_valid = 0;
    mmb_msu_nrns_valid = 1; }
if (msu_mmb_pa[39:24] < nrns_region_global_start) {
    mmb_msu_addr[39:24]    =    msu_mmb_pa[39:24]
rns_region_start;
} else if (msu_mmb_pa[39:24] <= nrns_region_end) {
    mmb_msu_addr[39:24] = msu_mmb_pa[39:24] -
        nrns_region_global_start +
        nrns_region_local_start;
} else { goto striped_region; }
```

The pseudo code above may be implemented using comparators.

If the LA does not fall in either the RNS or NRNS regions then the LA belongs to the NRS region. Implementation of the proposed striping optimization in LMB may imply that calculation of MSU PA in the striped region needs a corresponding logic. The following pseudo-code describes operations performed on the LA to obtain the PA in a striped region.

```
striped_region:
    mmb_msu_addr[39:24] = msu_mmb_pa[39:24] -
        nrs_region_global_start;
    x = mmb_msu_addr[39:17];
```

```
y = mmb_msu_addr[16:11] / 5;
mmb_msu_addr[39:11] = x<<3 + x<<2 + x + y +
    nrs_region_local_start;
```

A general expression to determine the PA from an LA in the striped regions is $$PA_{striped} = \left( \left\lfloor \frac{2^{MOD_{BITS}} - 1}{NUM_{MSU}} \right\rfloor + 1 \right) \times LA[BLK_{MSB}: BLK_{LSB} + MOD_{BITS}] + \left\lfloor \frac{LA[BLK_{LSB} + MOD_{BITS} - 1: BLK_{LSB}]}{NUM_{MSU}} \right\rfloor,$$

where LA is the logical address of the block, $BLK_{LSB}$ is the LSB of the block's LA that will be used to generate the MSU ID, $MOD_{BITS}$ is the number of bits of the LA used in the modulus operation to determine MSU ID, and $NUM_{MSU}$ is the number of MSUs in the system (e.g., $NUM_{MSU}=n$ for the system of FIG. 1).

Figure 5:
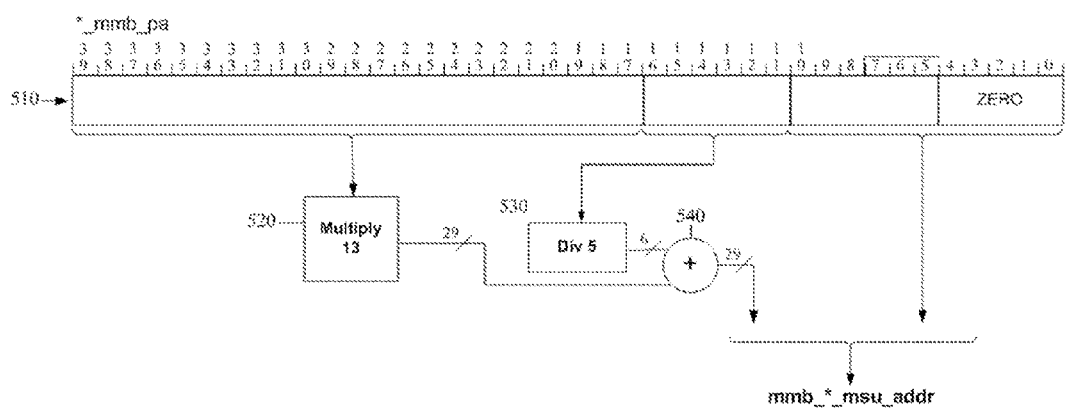
FIG. 5 is a schematic of an embodiment of a portion of a memory streaming unit (MSU) magic block (MMB).

FIG. 5 is a schematic of an embodiment of a portion of an MMB that performs address conversion for a striped region. The embodiment may implement the pseudo-code above for a striped region for a 40-bit LA 510. The embodiment may comprise multiplier 520, divider 530, and adder 540 configured as shown in FIG. 5, each of which may be implemented using standard digital logic circuits. The sixteen MSBs may be input to multiplier 520. The output of multiplier 520 may be represented by 29 bits. Bits 11 through 16 of the LA 510 may be divided by 5 by divider block 530. The division may be an integer division. The divider block may be realized in a single-cycle combinatorial circuit. The output of divider 530 may be represented by six bits. The 29-bit output of multiplier 520 may be added to the six-bit output of divider 530 using adder 540 to produce a 29-bit output, which is concatenated with bits 0 through 10 of LA 510 to form output mmb_*_msu_addr, which is the PA corresponding to LA 510. For a 40-bit LA address conversion, it may be possible to perform an address translation using embodiments of LMBs and MMBs such as those in FIGS. 3 and 5, respectively, in as little as one clock cycle for a 1.2 gigahertz (GHz) clock.

The embodiment of the MMB in FIG. 5 may be generalized for an arbitrary number n of MSUs and an arbitrary number of bits in the LA. For example, the multiplier 520 may be a multiplier that multiplies an input by $$\left( \left\lfloor \frac{2^{MOD_{BITS}} - 1}{NUM_{MSU}} \right\rfloor + 1 \right).$$

Further, the divider 530 may be configured as a divider by the integer n. An adder may be configured to replace adder 540 to add any two numbers together.

Figure 6:
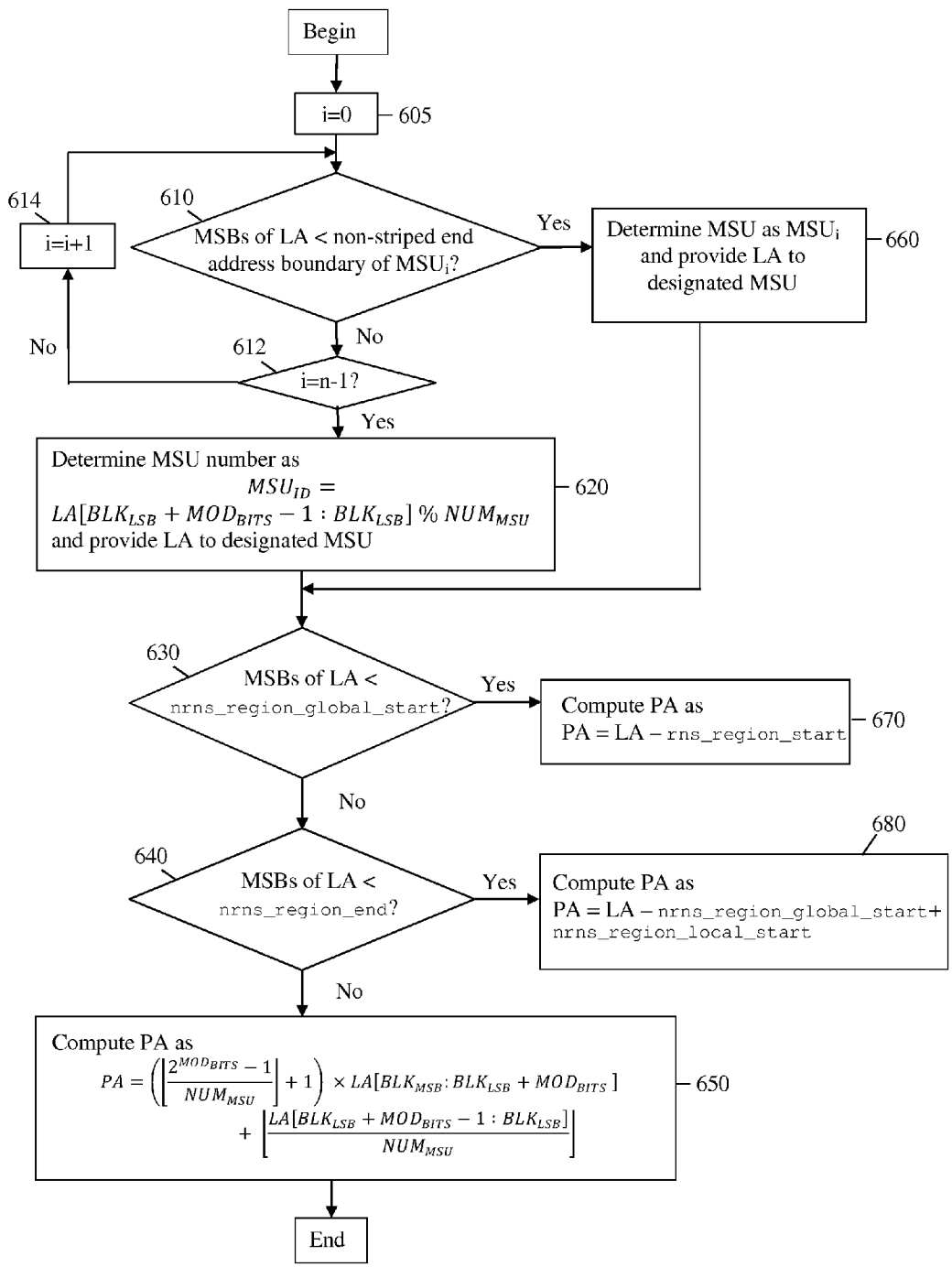
FIG. 6 is an embodiment of a method for mapping an LA to an MSU and a PA within the MSU.

FIG. 6 is an embodiment of a method for mapping an LA to an MSU and a PA within the MSU. The LA may be an arbitrary number of bits, and there may be an arbitrary number of MSUs. In step 605, a variable i may be set to zero. In step 610, a determination may be made whether a number comprising the MSBs of an LA is less than a non-striped end address boundary of the MSU$_i$ (i.e., the ith MSU), which may be denoted as nrns_region_end_i. If so, the method continues to step 660, in which the MSU may be determined as MSU$_i$, and the LA is provided to MSU$_i$. If the MSBs are not less than a non-striped end address boundary of MSU$_i$, then the method proceeds to step 612, in which a determination may be made whether i equals n−1. If not, i is incremented in step 614, and step 610 may be repeated. If i equals n−1 in step 612, the method proceeds to step 620, in which the MSU number may be determined as MSU$_{ID}$=LA[BLK$_{LSB}$+MOD$_{BITS}$−1: BLK$_{LSB}$] % NUM$_{MSU}$ and the LA is provided to the determined MSU. In this embodiment, NUM$_{MSU}$ equals n. After the MSU number is determined, the method continues to step 630 in which a determination may be made whether a number comprising the MSBs of LA is less than nrns_region_ global_start, which may be a global logical start address of the global NRS region. If so, the method ends at step 670, in which the PA may be computed as LA−rns_region_start. If the comparison is not true in step 630, the method continues to comparison step 640, in which a determination may be made whether a number comprising MSBs of LA is less than nrns_region_end. If so, the method ends at step 680, in which the PA may be computed as LA−nrns_region_global_start+ nrns_region_local_start. If not, the method ends at step 650 in which the PA may be computed as $$PA = \left(\left\lfloor\frac{2^{MOD_{BITS}} - 1}{NUM_{MSU}}\right\rfloor + 1\right) \times LA[BLK_{MSB}: BLK_{LSB} + MOD_{BITS}] + \left\lfloor\frac{LA[BLK_{LSB} + MOD_{BITS} - 1: BLK_{LSB}]}{NUM_{MSU}}\right\rfloor,$$

where LA is the logical address of the block, BLK$_{LSB}$ is the LSB of the block's LA that will be used to generate the MSU ID, MOD$_{BITS}$ is the number of bits of the LA used in the modulus operation to determine the MSU ID, and NUM$_{MSU}$ is the number of MSUs in the system (e.g., NUM$_{MSU}$=n for the system of FIG. 1).

Figure 7:
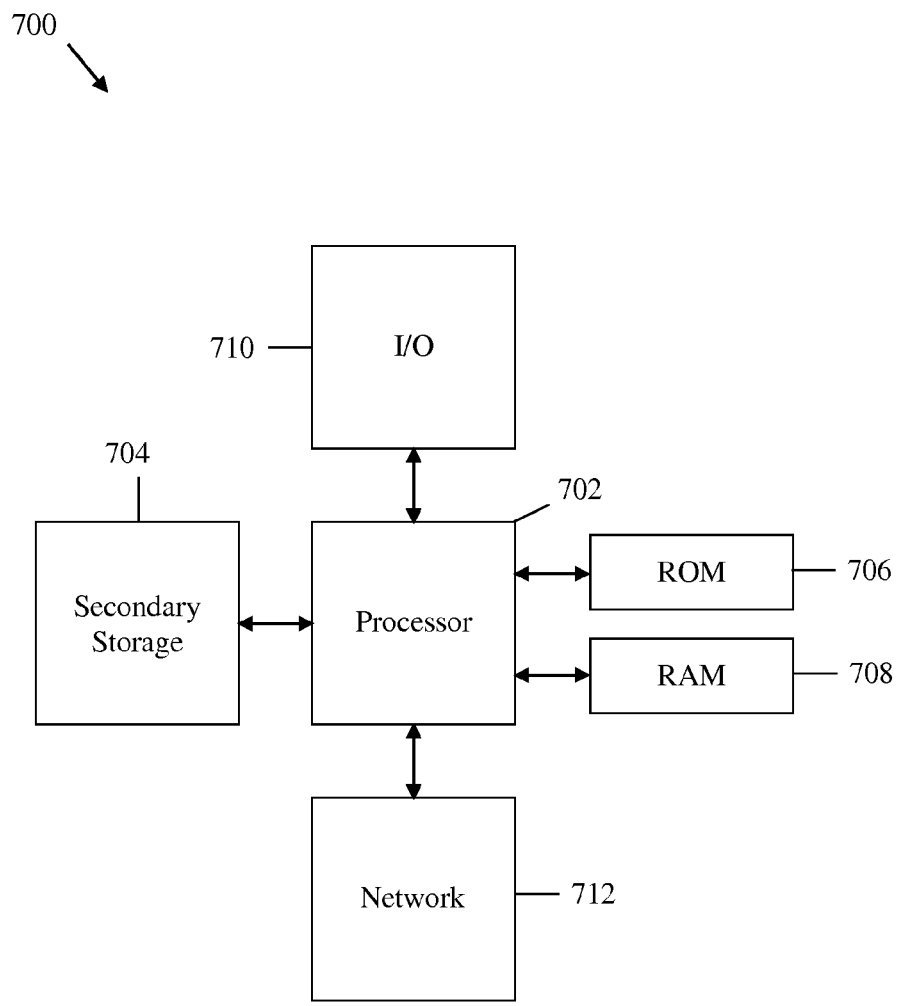
FIG. 7 illustrates a schematic diagram of an embodiment of a general-purpose network component.

Various systems and methods described above may be implemented on a general-purpose network component, such as a computer or network component with sufficient processing power, memory resources, and network throughput capability to handle the necessary workload placed upon it. FIG. 7 illustrates a schematic diagram of an embodiment of a general-purpose network component 700. The network component 700 includes a processor 702 (which may be referred to as a central processor unit or CPU) that is in communication with memory devices including secondary storage 704, read only memory (ROM) 706, random-access memory (RAM) 708, input/output (I/O) devices 710, and network connectivity devices 712. The processor 702 may be implemented as one or more CPU chips, or may be part of one or more application specific integrated circuits (ASICs).

The secondary storage 704 is typically comprised of one or more disk drives or tape drives and is used for non-volatile storage of data and as an over-flow data storage device if RAM 708 is not large enough to hold all working data. Secondary storage 704 may be used to store programs that are loaded into RAM 708 when such programs are selected for execution. The ROM 706 is used to store instructions and perhaps data that are read during program execution. ROM 706 is a non-volatile memory device that typically has a small memory capacity relative to the larger memory capacity of secondary storage 704. The RAM 708 is used to store volatile data and perhaps to store instructions. Access to both ROM 706 and RAM 708 is typically faster than to secondary storage 704.

The processor 702 may comprise one or more system cores, such as system cores 110, 120, and 130 in FIG. 1, with each of the system cores comprising a LMB, such as LMBs 115, 125, and 135 in FIG. 1. One or more of the memory devices, such as RAM 708, may comprise one or more MSUs, such as MSUs 160, 170, and 180 in FIG. 1. The general-purpose network component 700 may further comprise a system interconnect, such as system interconnect 150, that may couple a processor to a memory device.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, R$_l$, and an upper limit, R$_u$, is disclosed, any number falling within the range is specifically disclosed. In particular, the following numbers within the range are specifically disclosed: R=R$_l$+k*(R$_u$−R$_l$), wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method for address translation in a memory comprising a plurality of memory streaming units (MSUs), wherein n represents the number of MSUs and n is not a power of two, and wherein the memory further comprises a striped region, the method comprising:
   determining an MSU from among the plurality of MSUs having a physical address (PA) in the striped region corresponding to a logical address (LA) comprising performing a modulo n operation on less than all the bits representing the LA; and
   transmitting the LA to the MSU.

2. The method of claim 1, wherein the memory further comprises a non-striped region, the method further comprising:
   determining a second MSU from among the plurality of MSUs having a second PA in the non-striped region corresponding to a second LA comprising using comparison operations.

3. The method of claim 2, further comprising:
   receiving the LA by the MSU;
   determining the PA based on an integer division comprising dividing less than all the bits representing the LA by n; and
   retrieving data from a memory location in the MSU corresponding to the PA.

4. The method of claim 3, further comprising:
   receiving the second LA by the second MSU;
   determining the second PA based on adding or subtracting values from a subset of the bits representing the second LA; and
   retrieving data from a second memory location in the MSU corresponding to the second PA.

5. The method of claim 4, wherein each of the MSUs comprises an MSU memory, wherein each MSU memory comprises a plurality of memory banks, wherein the non-striped region comprises a replicated and non-striped (RNS) region, a non-replicated and non-striped (NRNS) region, and wherein the striped region comprises a non-replicated striped (NRS) region, wherein each of the MSU memories comprises portions of the RNS, NRS, and NRNS regions, wherein the RNS region is a region in which each block of stored data within the MSU is replicated across memory banks within the MSU but the LA space of the RNS region is not striped across MSUs, the NRS region is a region in which the LA space is striped across MSUs and each block of data stored in an NRS region is not replicated across memory banks, and the NRNS region is a region in which the LA space is not striped across MSUs and each block of data stored in an NRNS region is not replicated across memory banks.

6. The method of claim 5, wherein performing the modulo n operation comprises computing $MSU_{ID}=LA[BLK_{LSB}+MOD_{BITS}-1:BLK_{LSB}]\%n$, where $MSU_{ID}$ is an identifier (ID) of the MSU, $LA[i]$ is the ith bit of the LA, $BLK_{LSB}$ is the LSB of the LA that is used to generate the MSU ID, $MOD_{BITS}$ is the number of bits of the LA used in the modulus operation, and $MOD_{BITS}$ is less than the total number of bits representing the LA.

7. The method of claim 6, wherein the PA is determined as $$PA = \left(\left\lfloor \frac{2^{MOD_{BITS}}-1}{n} \right\rfloor + 1\right) \times LA[BLK_{MSB}: BLK_{LSB}+MOD_{BITS}] + \left\lfloor \frac{LA[BLK_{LSB}+MOD_{BITS}-1: BLK_{LSB}]}{n} \right\rfloor,$$

wherein $BLK_{MSB}$ is the MSB of the LA that is used to generate the MSU ID.

8. An apparatus comprising:
   a memory comprising a plurality of memory streaming units (MSUs), wherein the number of MSUs is represented as n and n is not a power of two, wherein the memory comprises a striped region; and
   a processor configured to determine an MSU from among the plurality of MSUs having a physical address (PA) in the striped region corresponding to a logical address (LA) comprising performing a modulo n operation on less than all the bits representing the LA.

9. An apparatus comprising:
   a memory comprising a plurality of memory streaming units (MSUs), wherein the number of MSUs is represented as n and n is not a power of two, wherein the memory comprises a striped region; and
   a processor configured to determine an MSU from among the plurality of MSUs having a physical address (PA) corresponding to a logical address (LA) comprising performing a modulo n operation on less than all the bits representing the LA,
   wherein the memory further comprises a non-striped region, and wherein the processor further determines a second MSU from among the plurality of MSUs having a second PA in the non-striped region corresponding to a second LA comprising using comparison operations.

10. The apparatus of claim 9, wherein each of the MSUs further comprises an MSU magic block (MMB) that:
   determines the PA is based on an integer division comprising dividing less than all bits of the LA by n; and
   determines the second PA based on adding to or subtracting values from less than all bits of the LA.

11. The apparatus of claim 10, further comprising a system interconnect coupled between the processor and the MSUs and configured to provide a selectable path for communication between the processor and each of the MSUs.

12. The apparatus of claim 11, wherein each of the MSUs comprises an MSU memory, wherein each MSU memory comprises a plurality of memory banks, wherein the non-striped region comprises a replicated and non-striped (RNS) region and a non-replicated and non-striped (NRNS) region, wherein the striped region comprises a non-replicated striped (NRS) region, wherein each of the MSU memories comprises portions of the RNS, NRS, and NRNS regions, wherein the RNS region is a region in which each block of stored data within the MSU is replicated across memory banks within the MSU but the LA space of the RNS region is not striped across MSUs, wherein the NRS region is a region in which the LA space is striped across MSUs and each block of data stored in an NRS region is not replicated across memory banks, and wherein the NRNS region is a region in which the LA space is not striped across MSUs and each block of data stored in an NRNS region is not replicated across memory banks.

13. The apparatus of claim 12, further comprising at least one additional processor, wherein the processor comprises a local magic block (LMB) that translates the LA and the second LA, wherein each of the at least one additional processor comprises a LMB, where each LMB in each of the at least one additional processor is configured to:
  translate the second LA to determine the second MSU identifier (ID) of the MSU corresponding to the second LA using comparison operations, and translate the LA to determine the MSU ID by performing the modulo n operation on less than all the bits of the LA,
  wherein the system interconnect is further coupled between the at least one additional processor and the MSUs, wherein the system interconnect is further configured to provide a selectable path between the at least one additional processor and each of the MSUs.

14. The apparatus of claim 13, wherein the modulo n operation to determine the MSU ID is $MSU_{ID} = LA[BLK_{LSB} + MOD_{BITS} - 1 : BLK_{LSB}] \% n$, where $MSU_{ID}$ is the MSU ID, LA[i] is the ith bit of LA, $BLK_{LSB}$ is the LSB of the IA that is used to generate the MSU ID, $MOD_{BITS}$ is the number of bits of the LA used in the modulus operation, and $MOD_{BITS}$ is less than the total number of bits representing the LA.

15. The apparatus of claim 14, wherein the PA is determined as $$PA = \left(\left\lfloor \frac{2^{MOD_{BITS}} - 1}{n} \right\rfloor + 1\right) \times LA[BLK_{MSB}: BLK_{LSB} + MOD_{BITS}] + \left\lfloor \frac{LA[BLK_{LSB} + MOD_{BITS} - 1: BLK_{LSB}]}{n} \right\rfloor,$$

wherein $BLK_{MSB}$ is the MSB of the LA that is used to generate the MSU ID.

16. The apparatus of claim 15, wherein n equals five, wherein the LA is represented by K bits and K equals 40, and wherein each LMB comprises:
  an address bound check circuit comprising five comparators and configured to receive the 17 most significant bits (MSBs) of the LA;
  a modulo-5 circuit configured to receive six bits of the LA;
  a first multiplexer configured to receive outputs from the modulo-5 circuit and the address bound check circuit;
  and a second multiplexer coupled to an output of the first multiplexer,
  wherein the output of the first multiplexer is used to select one of five MSU IDs corresponding to each of the five MSUs.

17. The apparatus of claim 16, wherein each MMB comprises:
  a multiply circuit that multiplies the 23 MSBs of the LA by 13 to produce a 29-bit output;
  a divider circuit that divides the next six MSBs of the LA by five to produce a six-bit output;
  an adder configured to add the 29-bit output and the six-bit output to produce a second 29-bit output,
  wherein the PA is the 29-bit output concatenated with the 11 least significant bits of the LA.

18. The apparatus of claim 17, wherein the apparatus is located in a single chip.

19. An apparatus comprising:
  a memory comprising a plurality of memory streaming units (MSUs), wherein the number of MSUs is represented as n and n is not a power of two, wherein the memory comprises a striped region and a non-striped region, wherein a logical address (LA) space comprising a plurality of LAs is distributed across the striped and non-striped regions, wherein each of the MSUs further comprises an MSU magic block (MMB); and
  a processor configured to translate an LA corresponding to a physical address (PA) to determine an MSU identifier (ID) of the MSU having the PA corresponding to the LA, wherein each MMB is configured to translate the LA into a PA, wherein if the PA corresponds to the non-striped region, the PA is determined based on adding to or subtracting values from less than all bits representing the LA, and wherein if the PA corresponds to the striped region, the PA is determined based on an integer division comprising dividing less than all bits representing the LA by n.

20. The apparatus of claim 19, wherein if the PA corresponds to the non-striped region, the MSU ID is determined using comparison operations, and wherein if the PA corresponds to the striped region, the MSU ID is determined by performing a modulo n operation on less than all bits representing the LA.

21. The apparatus of claim 20, further comprising a system interconnect coupled between the processor and the MSUs and configured to provide a selectable path for communication between the processor and each of the MSUs.

22. The apparatus of claim 21, wherein each of the MSUs comprises an MSU memory, wherein each MSU memory comprises a plurality of memory banks, wherein the non-striped region comprises a replicated and non-striped (RNS) region and a non-replicated and non-striped (NRNS) region, wherein the striped region comprises a non-replicated striped (NRS) region, wherein each of the MSU memories comprises portions of the RNS, NRS, and NRNS regions, wherein the RNS region is a region in which each block of stored data within the MSU is replicated across memory banks within the MSU but the LA space of the RNS region is not striped across MSUs, the NRS region is a region in which the LA space is striped across MSUs and each block of data stored in an NRS region is not replicated across memory banks, and the NRNS region is a region in which the LA space is not striped across MSUs and each block of data stored in an NRNS region is not replicated across memory banks.

23. The apparatus of claim 22, further comprising at least one additional processor, wherein the processor comprises a local magic block (LMB) configured to translate the LA, wherein each of the at least one additional processor comprises a LMB, where each LMB in each of the at least one additional processor is configured to:
  translate the LA to determine the MSU ID of the MSU corresponding to the LA, wherein if the PA corresponds to the non-striped region, the MSU ID is determined using comparison operations, and wherein if the PA corresponds to the striped region, the MSU ID is determined by performing the modulo n operation on less than all bits representing the LA,
  wherein the system interconnect is further coupled between the at least one additional processor and the MSUs, wherein the system interconnect is further configured to provide a selectable path between the at least one additional processor and each of the MSUs.

24. The apparatus of claim 23, wherein the modulo n operation to determine the MSU ID is $MSU_{ID}=LA[BLK_{LSB}+MOD_{BITS}-1:BLK_{LSB}] \% n$, where $MSU_{ID}$ is the MSU ID, LA is the logical address of the block, $BLK_{LSB}$ is the LSB of the block's LA that is used to generate the MSU ID, and $MOD_{BITS}$ is the number of bits of the LA used in the modulus operation.

25. The apparatus of claim 24, wherein if the PA corresponds to the striped region, the PA is determined as $$PA = \left( \left\lfloor \frac{2^{MOD_{BITS}}-1}{n} \right\rfloor + 1 \right) \times LA[BLK_{MSB}: BLK_{LSB} + MOD_{BITS}] + \left\lfloor \frac{LA[BLK_{LSB} + MOD_{BITS} - 1: BLK_{LSB}]}{n} \right\rfloor,$$

wherein $BLK_{MSB}$ is the MSB of the LA that is used to generate the MSU ID.

26. The apparatus of claim 25, wherein n equals five, wherein the LA is represented by K bits and K equals 40, and wherein each LMB comprises:

an address bound check circuit comprising five comparators and configured to receive the 17 most significant bits (MSBs) of the LA;
a modulo-5 circuit configured to receive six bits of the LA;
a first multiplexer configured to receive outputs from the modulo-5 circuit and the address bound check circuit;
and a second multiplexer coupled to an output of the first multiplexer,
wherein the output of the first multiplexer is used to select one of five MSU IDs corresponding to each of the five MSUs.

27. The apparatus of claim 26, wherein each MMB comprises:
a multiply circuit that multiplies the 23 MSBs of the LA by 13 to produce a 29-bit output;
a divider circuit that divides the next six MSBs of the LA by five to produce a six-bit output;
an adder configured to add the 29-bit output and the six-bit output to produce a second 29-bit output,
wherein the PA is the 29-bit output concatenated with the 11 least significant bits of the LA.

* * * * *

UNITED STATES PATENT AND TRADEMARK OFFICE
CERTIFICATE OF CORRECTION

PATENT NO. : 9,135,170 B2
APPLICATION NO. : 13/472180
DATED : September 15, 2015
INVENTOR(S) : Kumar et al.

It is certified that error appears in the above-identified patent and that said Letters Patent is hereby corrected as shown below:

Column 15, Line 27, Claim 14 should read:

The apparatus of claim 13, wherein the modulo n operation to determine the MSU ID is
$MSU_{ID} = LA[BLK_{LSB} + MOD_{BITS} - 1 : BLK_{LSB}] \% n$, where $MSU_{ID}$ is the MSU ID, $LA[i]$ is the ith bit of LA, $BLK_{LSB}$ is the LSB of the LA that is used to generate the MSU ID, $MOD_{BITS}$ is the number of bits of the LA used in the modulus operation, and $MOD_{BITS}$ is less than the total number of bits representing the LA.

Signed and Sealed this
Fifteenth Day of March, 2016

Michelle K. Lee
*Director of the United States Patent and Trademark Office*